Figure 1:
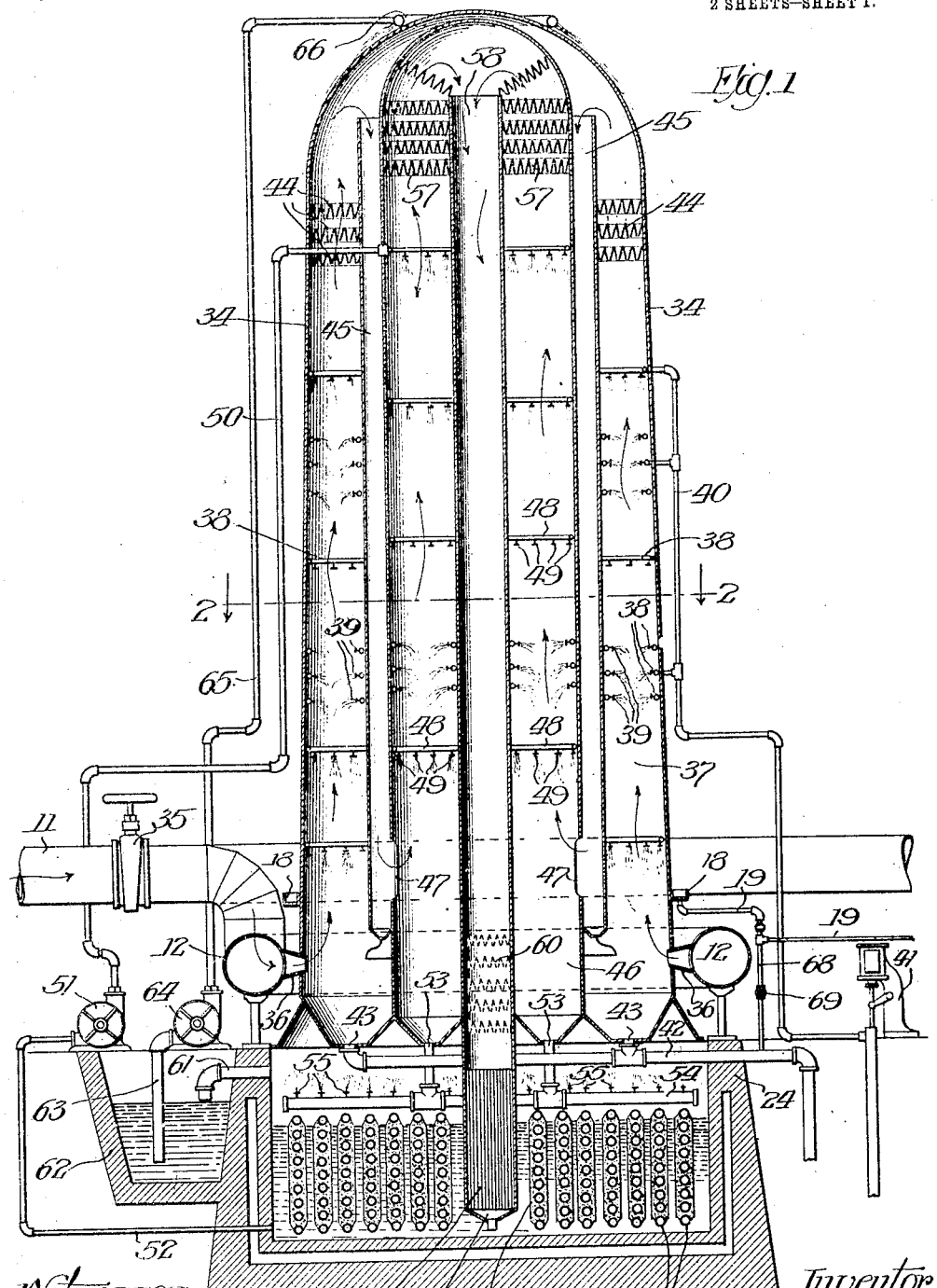

C. H. LEINERT.
AIR DRYING APPARATUS.
APPLICATION FILED MAY 31, 1912.

1,060,269.

Patented Apr. 29, 1913.

2 SHEETS—SHEET 1.

C. H. LEINERT.
AIR DRYING APPARATUS.
APPLICATION FILED MAY 31, 1912.
1,060,269.
Patented Apr. 29, 1913.
2 SHEETS—SHEET 2.
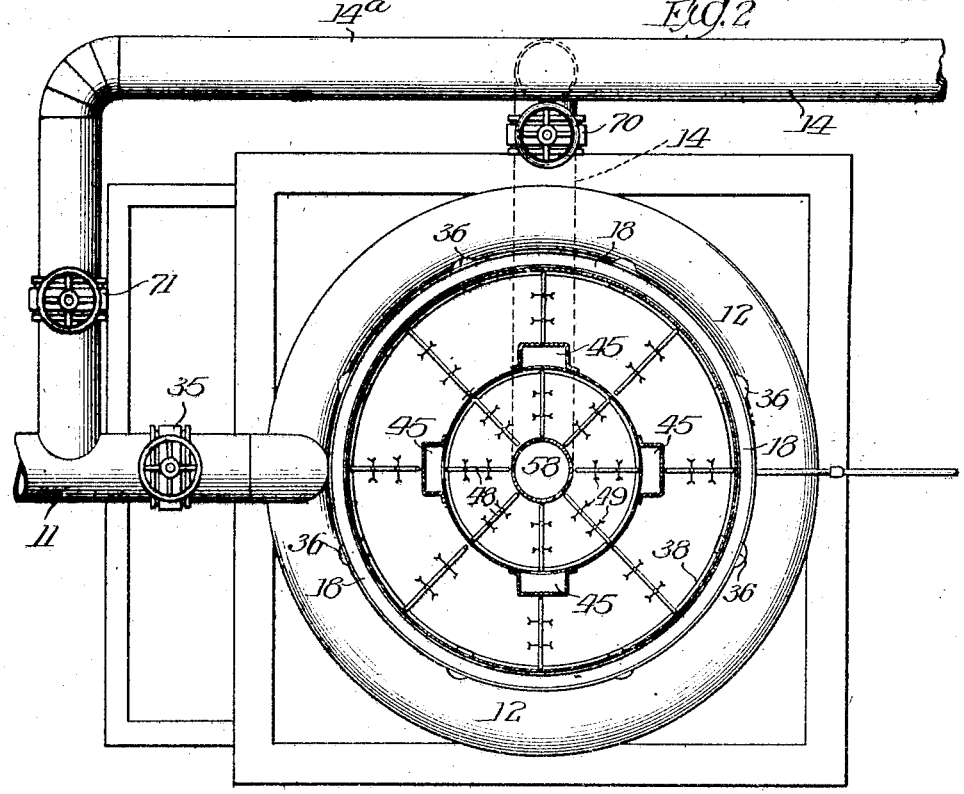
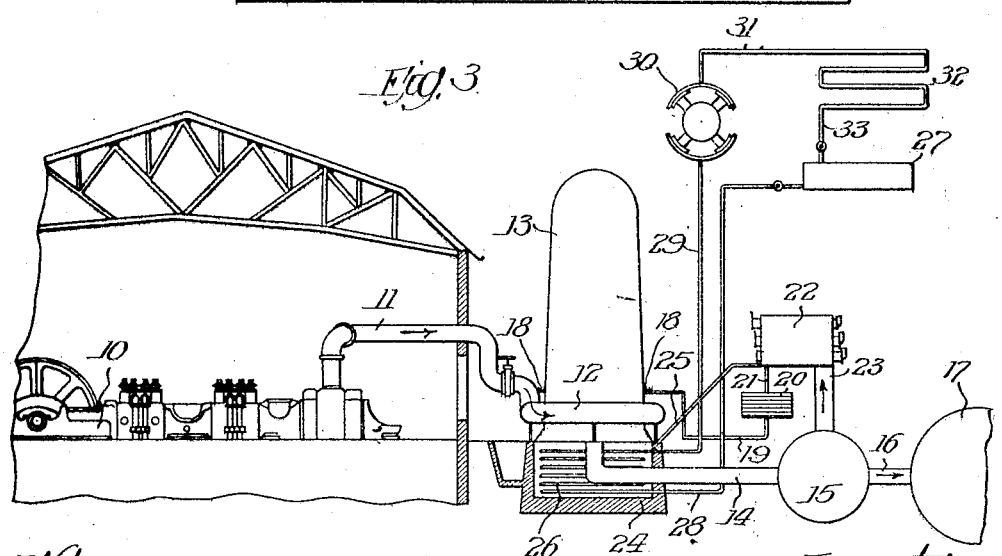

UNITED STATES PATENT OFFICE.

CHARLES H. LEINERT, OF CHICAGO, ILLINOIS.

AIR-DRYING APPARATUS.

1,060,269.  Specification of Letters Patent.  Patented Apr. 29, 1913.

Application filed May 31, 1912. Serial No. 700,637.

*To all whom it may concern:*

Be it known that I, CHARLES H. LEINERT, a citizen of the United States, residing at Chicago, in the county of Cook and State of Illinois, have invented certain new and useful Improvements in Air-Drying Apparatus, of which the following is a specification.

My invention relates to apparatus for drying air, and is particularly useful in connection with drying the air which is to be used for the blast of iron-making furnaces. It is well known that there is great advantage in drying air when it is in a state of compression, since under such circumstances the temperature to which it is necessary to cool the air in order to get a certain fixed percentage of moisture at atmospheric pressure is higher than when the same percentage of moisture at atmospheric pressure is obtained if the air is uncompressed. On the other hand, the great disadvantage of cooling the air in a state of compression has been the necessity of providing a cooling apparatus from which the air will not have an opportunity to leak.

In my improved apparatus I use a cooling tower which is of simple construction and so made that there is no opportunity for the leakage of the compressed air. This tower is preferably round, and consists of an outer preliminary cooling chamber and a final cooling chamber located within and surrounded by the preliminary cooling chamber. The preliminary cooling chamber is supplied with a number of jets through which water, at an ordinary temperature (for example, between 45 and 70° F.) is forced, while the final cooling chamber is provided with jets through which water or a solution of brine at a temperature of approximately 32° F. is forced. The air is supplied to the cooling tower at the lower portion of the preliminary cooling chamber, through which it passes upwardly coming in contact with the spray of water coming form the jets which have been mentioned. The air next passes downwardly through a series of passages leading to the lower portion of the final cooling chamber, then upwardly through the final cooling chamber, and then in a downward direction through an outlet passage leading from the upper portion of the final cooling chamber to the conduit leading to the blast furnace stoves.

In order to keep the exterior of the cooling tower at a comparatively low temperature, I preferably supply water or brine to its exterior, such water or brine being drawn from the supply which has passed through the final cooling chamber, and is, for this reason, at a comparatively low temperature. The liquid which I supply to the exterior of the cooling tower is collected in a suitable trough, and if water is used it is allowed to flow to a waste pipe, whereas if brine has been employed the same is carried to a concentrator where it is subjected to evaporation, preferably by waste heat from the stove, and is then returned to a brine-cooling tank located below the cooling tower.

It will be seen from the above general description of my invention that it possesses many features of simplicity and efficiency of operation. The pressure within the entire tower is equal, so that for the various partitions and the like which are used between the cooling compartments and the passages connecting the same it is only necessary to employ comparatively thin material. The outer shell of the tower should, of course, be of somewhat heavier material in order to resist the force of the compressed air within the tower.

These and other advantages of my invention will be more readily understood by reference to the accompanying drawings, which show a preferred embodiment of my invention, and in which:

Figure 1 is a vertical section through the cooling tower; Fig. 2 is a transverse section taken on the line 2—2 of Fig. 1; and, Fig. 3 is a diagrammatic representation of my cooling tower as used in connection with the blowing engine, blast furnace, and blast furnace stoves.

I will first describe my system as a whole in order that later the detailed description of the cooling tower may be more thoroughly understood.

Referring to Fig. 3, the air is first compressed by the blowing engine 10, from which it passes through conduit 11 to the bustle pipe 12 surrounding the lower portion of the cooling tower 13. From the bustle pipe 12 the air passes into the cooling tower 13 in which a large proportion of the moisture is extracted from the air. The air then passes through the conduit 14 to one or more stoves 15, in which the air is heated, and then passes through the blast pipe 16 to the blast furnace 17. When brine is supplied to the outside of the cooling tower 13, in a manner which will be described in detail hereafter, this brine is collected in the trough 18, and then passes through pipe 19 to the filter 20, and then through the pipe 21 to the concentrator 22, which is supplied with waste heat from the stove 15 by means of the conduit 23. After the brine has been concentrated it is returned to the cooling tank 24 through the chute 25.

The cooling tank 24 is provided with ammonia coils 26, the supply of ammonia coming from the ammonia receiver 27 through the pipe 28. After the ammonia has passed through the coils 26 it goes through pipe 29 to the compresser 30, from thence through pipe 31 to the condenser 32, and then back to the ammonia receiver 27 through the pipe 33.

Turning now to the description of the cooling tower, as shown in Figs. 1 and 2 the tower itself has an outer shell 34, which is of circular shape provided with a convex top, and gradually increases in diameter toward the bottom. The shell 34 is supported on any suitable foundations which are preferably of concrete and may be the side walls of the cooling tank 24. Within the cooling tank 24 are the coils 26, which have previously been described. These coils are preferably arranged in parallel rows, and are connected with each other by suitable pipes so that the ammonia passes freely through all of them. The conduit 11, which is connected with the blowing engine, is provided with a valve 35 at a point near the bustle pipe 12. The bustle pipe 12 connects with the lower portion of the cooling tower through a plurality of passages 36. These passages open directly into the preliminary cooling chamber 37, which is adjacent to the periphery of the cooling tower. The preliminary cooling chamber 37 is provided throughout the greater part of its height with pipes 38, which have a plurality of spraying nozzles 39. The pipes 38 are in direct communication with the pipe 40, through which lake water, or the like, of ordinary temperature, is forced by means of the pump 41. The bottom of the preliminary cooling chamber 37 is V-shaped in order to readily collect the water passing through the nozzles 39. This water passes from the preliminary cooling chamber into the waste pipe 42 through the outlets 43.

Near the upper part of the preliminary cooling chamber 37 is a plurality of moisture eliminators 44, through which the air is caused to pass in a zigzag path so that the moisture which is mechanically mixed with the air, is caught by the eliminators. The passages 45 extend from the upper part of the preliminary cooling chamber 37 to the lower portion of the final cooling chamber 46, with which the passages 45 connect through the openings 47. The final cooling chamber 46 is preferably circular in shape, and is provided with a number of pipes 48 having thereon the spraying nozzles 49. The pipes 48 communicate with the pipe 50 which leads from the pump 51, and the pipe 52 leads from the pump 51 to the lower portion of the cooling tank 24. The lower part of the final cooling chamber 46 is V-shaped, and communicates through the outlet pipes 53 with the distributing pipe 54 having a plurality of spraying nozzles 55. The water or other liquid connecting in the bottom of the final cooling chamber 46 passes through the outlet pipes 53 to the distributing pipe 54, and thence through the spraying nozzles 55 to the cooling coils 26. These coils are generally surrounded with layers of ice 56.

The cooling tank 24 is filled with water or brine preferably consisting of a solution of calcium chlorid. The water or brine which is cooled by the coils 26 is pumped from the cooling tank through the pipe 52, and then passes through pipe 50 to the pipes 48, from which it is sprayed through the nozzles 49 in various parts of the final cooling chamber 46, this cooled water or brine then being returned to the tank 24 through the outlet pipe 53, distributing pipe 54, and nozzles 55. The upper portion of the final cooling chamber 46 is provided with moisture eliminators 57 similar to the eliminators 44, and which also have the function of removing moisture which is mechanically mixed with the air passing through the final cooling chamber. From a point just above the eliminators 57 the outlet passage 58 leads to the conduit 14, the moisture eliminators 59 being provided at the point of junction of the outlet passage 58 and the conduit 14. The outlet passage 58 is also preferably provided near its lower part with the moisture eliminators 60.

The cooling tank 24 has near its upper part the overflow pipe 61 leading to the overflow tank 62. Extending into this tank is the pipe 63 communicating with the pump 64, which, also, has connected therewith the pipe 65 leading to the circular distributing pipe 66 at the top of the cooling tower 13. The distributing pipe 66 has a plurality of apertures through which water or brine, as the case may be, is forced. The liquid which is forced through the apertures of the distributing pipe 66 passes downwardly over the outer surface of the cooling tower and collects in the trough 67. Leading from the trough 67 is the pipe 19, which, as shown in Fig. 3, leads to the filter 20. Connected with the pipe 19 is the pipe 68 leading to the waste pipe 42. The pipe 68 is provided with the valve 69.

As shown in Fig. 2, a by-pass pipe 14ᵃ is preferably provided, which connects the pipe 11 at a point between the valve 35 and the blowing engine with the conduit 14 at a point between the valve 70 and the stove 15. The by-pass 14ᵃ is provided with the valve 71. By the use of this by-pass, if the valves 35 and 70 are closed and the valve 71 open, the air will pass directly from the blowing engine to the stove 15, whereas if the valve 71 is closed and the valves 35 and 70 are open, the air will pass through the cooling tower 13 before going to the stove 15.

Having thus described the construction of the various parts used in my invention, the operation of the same may now be readily understood: The air which is ultimately to be supplied to the blast furnace is compressed by the blowing engine 10 to approximately two atmospheres, and then passes through the pipe 11 to the bustle pipe 12; from which it next passes through passages 36 into the lower part of the preliminary cooling chamber 37. The air next passes upwardly through the preliminary cooling chamber, coming in contact with the water which is being sprayed through the preliminary cooling chamber by means of the spraying nozzles 39. When the air reaches the upper part of the preliminary cooling chamber 37 it comes in contact with the moisture eliminators 44, and any water in the form of mist which may be mechanically entrained with the air is thereby removed. After passing through the eliminators the direction of flow of the air is reversed, and it passes downwardly through the passages 45, after which its direction is again reversed, passing through the apertures 47 and then upwardly through the final cooling chamber 46. This chamber is filled with sprayed liquid which is forced through the spraying nozzles 49, and, as previously described, this liquid is at a comparatively low temperature on account of being drawn from the cooling tank 24. The temperature of the air is preferably lowered to about 32° F. by being brought into contact with the sprayed liquid within the final cooling chamber. The air then passes through the moisture eliminators 57, after which its direction is again reversed, and it passes downwardly through the outlet passage 58, then through the moisture eliminators 60 and 59, into the conduit 14 leading to the stove 15.

It will be apparent that a certain fixed volume of air will come from the blowing engine, but on account of the fact that the initial temperature of this air may vary, it will be clear that, on cooling the compressed air to a certain fixed temperature, the volume of such compressed cooled air will vary. In order to provide for a definite amount of air passing to the stove 14, any suitably regulating device may be inserted between the cooling tower 13 and the stove 15. The construction of such a device, however, forms no part of the present invention.

The overflow tank 63 is provided, since it will be apparent that on account of the constant absorption of moisture from the air as the latter passes through the final cooling chamber the volume of the liquid which is pumped to said chamber will constantly increase. If water is employed in the cooling tank 24, the excess water resulting from the absorption of moisture from the air passes into overflow tank 63, is pumped over the exterior of the cooling tower, collects in trough 67, and then passes through pipes 19 and 68 into the waste pipe 42, the valve 69 being opened. On the other hand, if brine is used in the cooling tank 24, the liquid flowing into the overflow tank 62 after being pumped to the exterior of the cooling tower and being collected in the trough 67 passes through the pipe 19 to the filter 20, and then through pipe 21 to the concentrator 22, the valve 69 of the pipe 68 being closed.

It will be clear to those skilled in the art that many changes could be made in the detailed construction of the invention which I have described without departing from the spirit or scope thereof.

What I claim is:

1. In a cooling tower, the combination of an outer chamber, cooling means within said chamber, an inner chamber inclosed by said outer chamber, cooling means within said inner chamber, and a passage connecting the upper portion of said outer chamber with the lower portion of said inner chamber, substantially as described.

2. In a cooling tower, the combination of an outer chamber, cooling means within said chamber, an inner chamber inclosed by said outer chamber, cooling means within said inner chamber, a passage connecting the upper portion of said outer chamber with the lower portion of said inner chamber, and an outlet passage extending downwardly through said inner chamber from the upper portion thereof, substantially as described.

3. In a cooling tower, the combination of an outer chamber, cooling means within said chamber, an inner chamber inclosed by said outer chamber, cooling means within said inner chamber, a plurality of passages extending from the upper portion of said outer chamber to the lower portion of said inner chamber, and an outlet passage extending downwardly from the upper portion of said inner chamber, substantially as described.

4. In combination with means for compressing air, a cooling tower for receiving said compressed air, said tower comprising an outer preliminary cooling chamber, liquid-spraying means within said chamber, a final cooling chamber located inside of said preliminary chamber, liquid-spraying means in said final cooling chamber, a tank having cooling means therein, and means for supplying liquid from said tank to said final cooling chamber, substantially as described.

5. An air-drying apparatus, comprising, in combination with a blowing engine, a cooling tower, a bustle pipe inclosing said tower, means for conducting compressed air from said blowing engine to said bustle pipe, a passage from said bustle pipe to the lower portion of said cooling tower, means for conducting air from said cooling tower, and means for spraying a cooling liquid within said tower, whereby the moisture content of the air passing through said tower will be reduced, substantially as described.

6. In combination with means for compressing air, a cooling tower for receiving said compressed air, said tower comprising an outer preliminary cooling chamber, a final cooling chamber located inside of said preliminary chamber, liquid-spraying means in said final cooling chamber, a tank having cooling means therein, and means for supplying liquid from said tank to said final cooling chamber, substantially as described.

CHARLES H. LEINERT.

Witnesses:
HENRY M. HUXLEY,
L. E. HANNEN.